United States Patent Office 2,869,361
Patented Jan. 20, 1959

2,869,361

METHOD AND APPARATUS FOR TESTING TIRES, BELTS OR THE LIKE

Ernest Frederick Powell, Wylde Green, and Harold John Lawton, Almondbury, England, assignors, by mesne assignments, to Dunlop Tire and Rubber Corporation, Buffalo, N. Y., a corporation of New York Application June 10, 1955, Serial No. 514,622

Claims priority, application Great Britain June 11, 1954

18 Claims. (Cl. 73—146)

This invention relates to a method and an apparatus for testing tires, belts or the like and more particularly to a method and apparatus for measuring the power loss of a tire, belt or the like and for producing and measuring the torque simultaneously transmitted thereby.

It is known to measure the power loss and the torque transmitted by a tire while under test by means of apparatus comprising a driven drum, an axle and wheel assembly for supporting a loaded tire in driven contact with the drum and means, such as a dynamometer, for providing a braking torque on the said axle. The braking torque causes slip to take place between the drum and tire which condition invariably occurs when a tire transmits power.

The apparatus subjects the tire simultaneously to conditions similar to those met under normal or, if desired, severe operating conditions, in which power is lost (due to the rolling resistance of the tire) and torque is transmitted.

Such apparatus, however, suffers from the disadvantage that a considerable amount of power is wastefully absorbed by the dynamometer.

Our invention provides a method and an apparatus (of the type referred to above) in which the amount of power lost in providing a transmission torque is comparatively small.

According to the invention a method of measuring the power loss of a tire and for producing and measuring the torque simultaneously transmitted thereby comprises loading a tire, into contact with the outer peripheral surface of a drum, driving the tire and the drum by means of a common motor and at different peripheral speeds whereby slip takes place therebetween, measuring the torque supplied by the motor in order to ascertain the tire power loss, measuring the speed of rotation of the tire, and measuring the torque transmitted from the tire back to the motor in order to ascertain the torque transmitted thereby.

According to our invention, also a method of the kind referred to above comprises loading a pair of directly coupled tires, each into contact with the outer peripheral surface of a drum, one being provided for each tire and one tire contacting a peripheral surface of one drum of greater diameter than the diameter of the peripheral surface of the drum contacted by the other tire, driving the drums by means of a common motor, measuring the torque transmitted between the tires, measuring the driving torque supplied by the motor, measuring the speed of rotation of the tires and measuring the torque transmitted between the motor and one of the drums.

According to another aspect of the invention apparatus for measuring the power loss of a tire and for producing and measuring the torque simultaneously transmitted thereby comprises a drum, a motor directly coupled thereto, a supporting member for supporting a tire in driving contact with an outer peripheral surface of the drum, means associated with the supporting member for applying a load to the tire, means for transmitting torque from a tire carried by the supporting member back to the motor, means for measuring the torque supplied by the motor and means for measuring the torque transmitted from the said tire back to the motor.

One form of apparatus according to the invention comprises a drum, having a substantially plain cylindrical outer peripheral surface directly coupled to a driving motor, and a wheel and axle assembly mounted adjacent to the drum, the common axis of the wheel and tire and the axis of the drum lying in parallel relationship. The axle is capable of being driven by the motor by means of a gearbox or the like at a speed such that the peripheral speed of a tire, supported by the wheel and axle under load and running on the drum periphery, is higher or lower than the peripheral speed of the drum so as to cause slip to take place between the mutually contacting surfaces of the tire and the drum. The tire power loss may be calculated from the measurement, by known means, of the driving torque supplied by the motor and from the measurement of the torque transmitted from the tire back to the motor, which is measured by known means associated with the axle carrying the wheel and tire.

Such an apparatus, though satisfactory for some purposes, suffers from the disadvantage that, during operation, a certain amount of energy is absorbed in the gearbox or the like.

According, therefore, to a preferred embodiment of the invention apparatus as referred to in the above-mentioned aspect of the invention comprises a second drum directly coupled to the motor at its end remote from that coupled to the first drum, one drum having a peripheral surface of greater diameter than a peripheral surface of the other drum, a second supporting member for supporting a second tire in driving contact with an outer peripheral surface of the second drum, a second means associated with the supporting member for applying a load to the second tire, an intermediate shaft and a universal joint attached thereto for directly coupling a tire carried by the second supporting member with a tire carried by the first supporting member and means attached to the said shaft for measuring the torque transmitted between the tires.

The apparatus may comprise drums of stepped diameter, means being provided for relatively adjusting the positions of the supporting members and the drums so that the tires may be driven under different conditions of slip, i. e. power transmission, according to the portion of the stepped diameter drums upon which they run, as will more clearly be understood as the description proceeds.

In addition, the tires may either be loaded with a dead weight, in which case, the said supporting members are attached to one end of a pivotted beam along which a loaded saddle may be traversed so as to adjust the amount of the load supported by the tires, or, alternatively, the tires may be hydraulically loaded after the manner to be described in a particular embodiment now to be described with reference to the accompanying drawings in which:

Figure 5 is a cross-sectional side elevational view of part of the apparatus, taken along the line 5—5 shown in Figure 2, the wheel and tire shown in Figure 2 having been removed.

Figure 1:
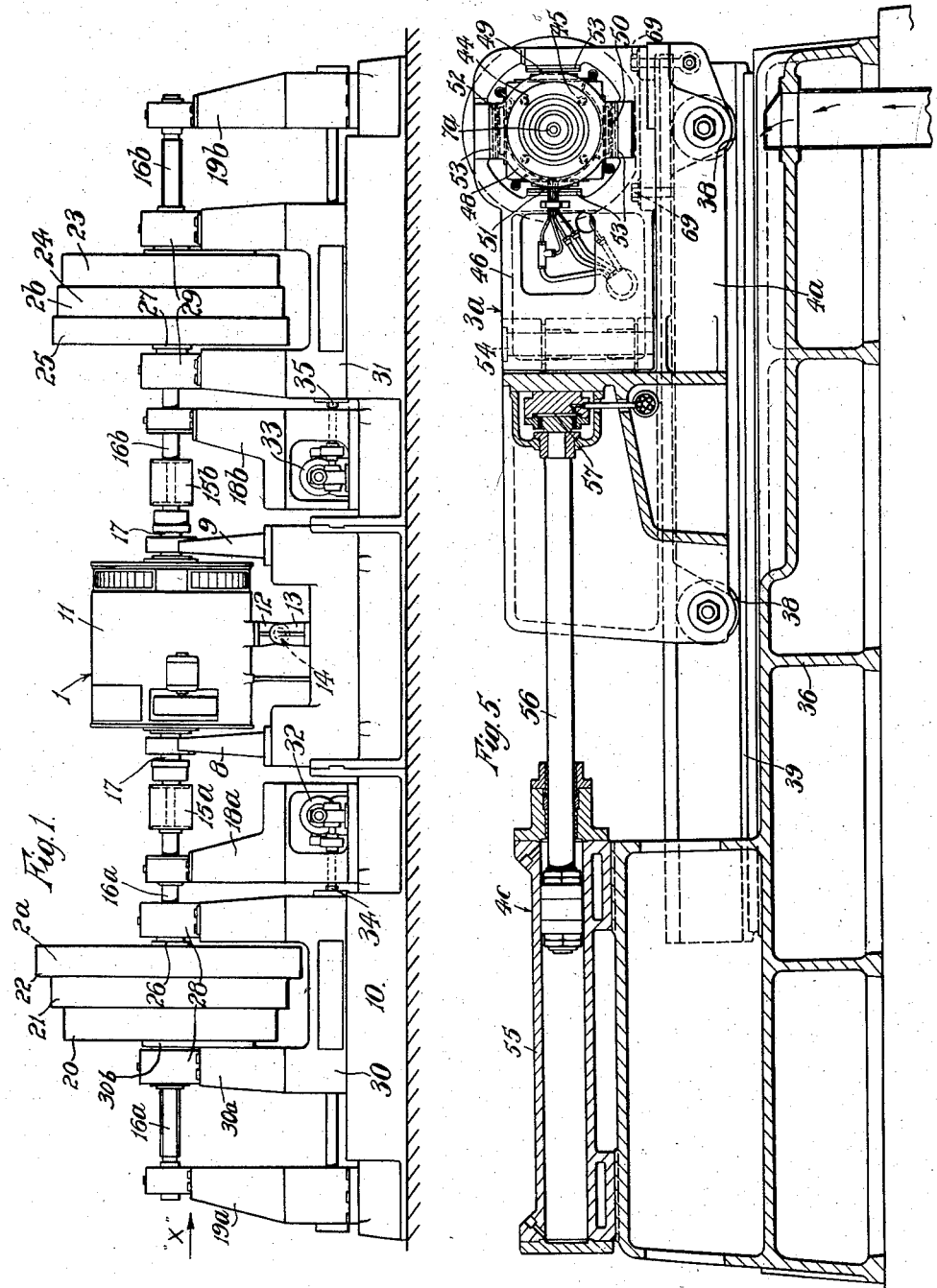
Figure 1 is a front elevational view of apparatus in accordance with the invention.

The machine for measuring the power loss of a tire and the torque simultaneously transmitted thereby which is illustrated in the drawings comprises essentially a trunnion-mounted electric driving motor 1, a pair of axially traversable drums (2a and 2b) driven thereby, a pair of tire supporting members (3a and 3b) each associated with a drum and mounted on traversable carriages (4a and 4b), an hydraulic piston and cylinder assembly (4c and 4d) (see Figure 5) for moving the tire supporting means and in order to load a pair of tires in contact with the drum peripheries, a pair of telescopic half shafts 5a and 5b directly coupled to a torquemeter 6—the system constituting an intermediate shaft for coupling wheel mounting spindles 7a and 7b forming part of the tire supporting means 3a and 3b.

The machine will now be more particularly described.

The driving motor 1 is supported between a pair of pedestal-type bearing assemblies (8 and 9) carried on a bed-plate 10 and the motor frame 11 is not rigidly attached to the bed-plate but is capable of limited rotational movement and is provided with a projecting trunnion 12 which is mounted between a pair of abutments 13 (one only being shown—see Figure 1) attached to the bed-plate 10. The trunnion 12 is locatable with a hydraulic load-measuring capsule 14 of known type carried by one of the abutments 13. This load capsule, when torque is being transmitted by the motor, is subjected to the torque-reaction load of the motor frame 11 and thus provides a means of measuring the torque delivered by the motor. The other of the abutments 13 serves to limit rotation of the frame 11 by providing an abutment for the trunnion 12—upon reversal of the torque transmitted or resisted by the motor frame.

Torquemeters 15a and 15b are associated with shafts 16a and 16b directly coupled to the motor shaft 17 and located between pedestal bearing assemblies 18a and 18b and the assemblies 8 and 9, i. e. on each side of the motor.

Outboard of the pedestal bearing assemblies 18a and 18b, the shafts 16a and 16b extend across the bed plate 10 and are supported by means of further pedestal type bearing assemblies 19a and 19b. The drums 2a and 2b are each provided with a stepped diameter on their outer peripheries, i. e. three plain cylindrical surfaces 20, 21 and 22 and 23, 24 and 25 of different diameters. Each drum is keyed to a sleeve 26 or 27 carried by and rotatable in a pair of bearing supporting members 28 or 29. Each of the sleeves 26 and 27 is internally splined and is slidable axially on the shaft 16a and 16b on correspondingly formed splines.

Each pair of bearing supporting members 28 and 29 is mounted on a base 30 or 31 traversable on the bedplate 10 by means of a small electric motor 32 or 33 and lead screws 34 or 35 so that the drums 2a and 2b can be independently moved axially relative to the shaft 16a and 16b.

Figure 3:
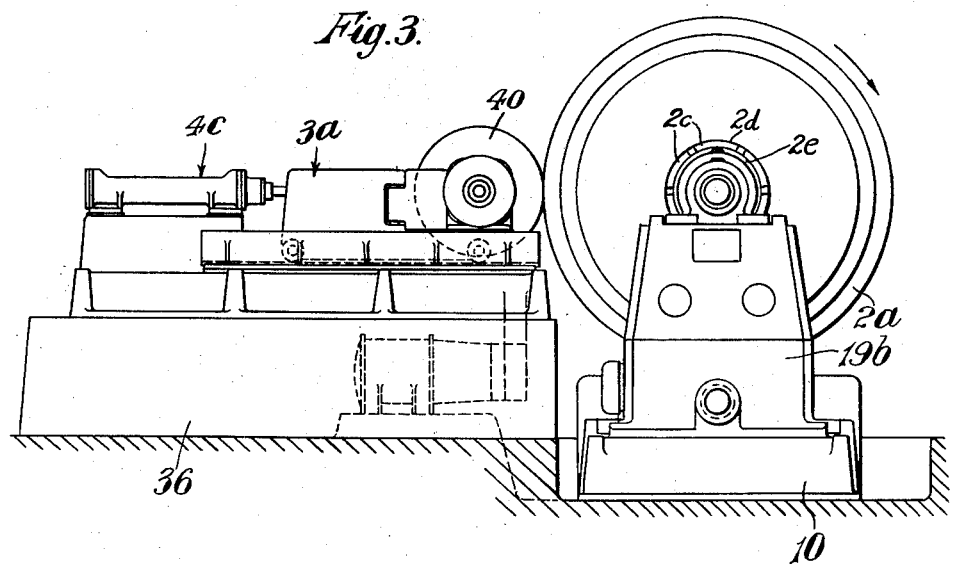
Figure 3 is an end elevational view taken in the direction of arrow "X" shown in Figure 1.
Figure 4:
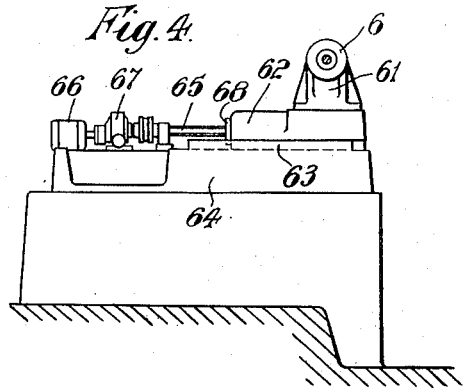
Figure 4 is a cross-sectional elevational view of part of the apparatus, taken along the line 4—4 shown in Figure 2.

Braking means, Fig. 3, for the drum 2a are provided, comprising brake segments 2c supported so that they may be forced against the inner surface of a hollow cylindrical portion 2d of the drum 2a by an annular air bag 2e supported on a cylinder co-axial with the drum 2a attached to the pedestal 30a by a plate 30b. Similar braking means are provided for the drum 2b so that the motor and drums can be simultaneously braked from positions on each side of the motor.

A bedplate 36 or 37 carrying the tire supporting member 3a or 3b is mounted adjacent to the drums. Each tire supporting member (see Figure 5) comprises the carriage 4a and 4b, said carriage being mounted on freely rotatable rollers 38 which are horizontally movable in a pair of channel-shaped spaced-apart parallel guides 39 rigidly mounted on a bedplate 36 or 37.

A wheel for carrying a tire 40 or 41 to be tested is locatable on the spindle 7a or 7b carried by a forked bearing carrying member 42 or 43. The axis of rotation of the spindles 7a and 7b lie in the horizontal plane in which the common axis of rotation of the motor and drum shaft lies.

Each of the spindles 7a and 7b is formed in two parts, each part having a half coupling member 44 (see Figure 5) drivably attached thereto, the half coupling being detachably attached together by means of bolts passing into tapped holes 45, the bolts serving, in addition, to clamp a wheel carrying a tire to be tested to the half-couplings.

Each of the forked bearing carrying members 42 or 43 is provided with a pair of hinged arms 46 and 47 and each arm of each pair carries a bearing 48 (see Figure 5) which is located, at 90° intervals, by load-measuring capsules 49, 50, 51 and 52. The load capsules are located in the vertical and horizontal planes, the upper load capsule 52 is a hydraulic capsule and is for measuring the tangential force transmitted by the drum (see Figure 3 which indicates the direction of rotation of the drum) to an associated tire and through a bearing 48 to the load capsule, the load capsule 50, also mounted in the vertical plane, being subjected to air pressure so as to pre-load the bearing in order to ensure a rigid bearing assembly and one which is free from vibration upon easing or reversal of the tangential load. The load capsule 49, mounted in the horizontal plane, is also an air capsule and is provided for this last-mentioned purpose, the capsule 51 being a hydraulic capsule and is provided for measuring the radial load of the tire against the drum.

Each of the load capsules 49, 50, 51 and 52 is mounted on a rubber pad 53. As previously stated each of the forked bearing members is provided with a pair of hinged arms, each arm being hingeable on a vertical pin 54 in order to mount or dismount a tire and wheel in the manner which will be more particularly described later in the specification. Each arm is secured to the carriages 4a and 4b by means of bolts 69 (see Figure 5).

It is necessary that only one arm, i. e. the left-hand arm in the case of the left-hand forked bearing member 42 and the right-hand arm in the case of the right-hand forked bearing member 43, should be pivotable. In order to avoid the manufacture of different assemblies for members 42 and 43 the design is such that both arms are made pivotable, though in practice only one arm, the left or the right-hand arm as the case may be, is pivotally utilised.

Each of the carriages 4a or 4b is movable towards and away from its associated drum, and a tire carried thereby is subject to load or unloaded, by means of the hydraulic piston and cylinder assembly 4c or 4d, the cylinder 55 being rigidly attached to the bedplate 36 or 37 and the piston rod 56 being connected to the load supported members 3a or 3b through a further hydraulic supporting measuring capsule 57 for measuring the radial load on the tire.

Each of the spindles 7a and 7b, upon which a wheel and tire to be tested are mounted, is provided at one end with a universal joint 58, the joints being connected to other universal joints 59, mounted on the torque-meter 6 located centrally of the machine, by means of the telescopic shafts 5a and 5b. The torquemeter 6 is carried at each end by bearings 60 and 61 mounted on a platform 62 slidable in channels 63 attached to the frame 64. A lead-screw 65 is attached at one end to a nut 68 attached to platform 62 and at the other end to an electric motor 66 and gear box 67 for traversing the platform towards and away from the axis of rotation of the drums.

Disc brakes 40a and 41a are provided on the spindles 7a and 7b.

The operation of the machine just outlined will now be described.

Figure 2:
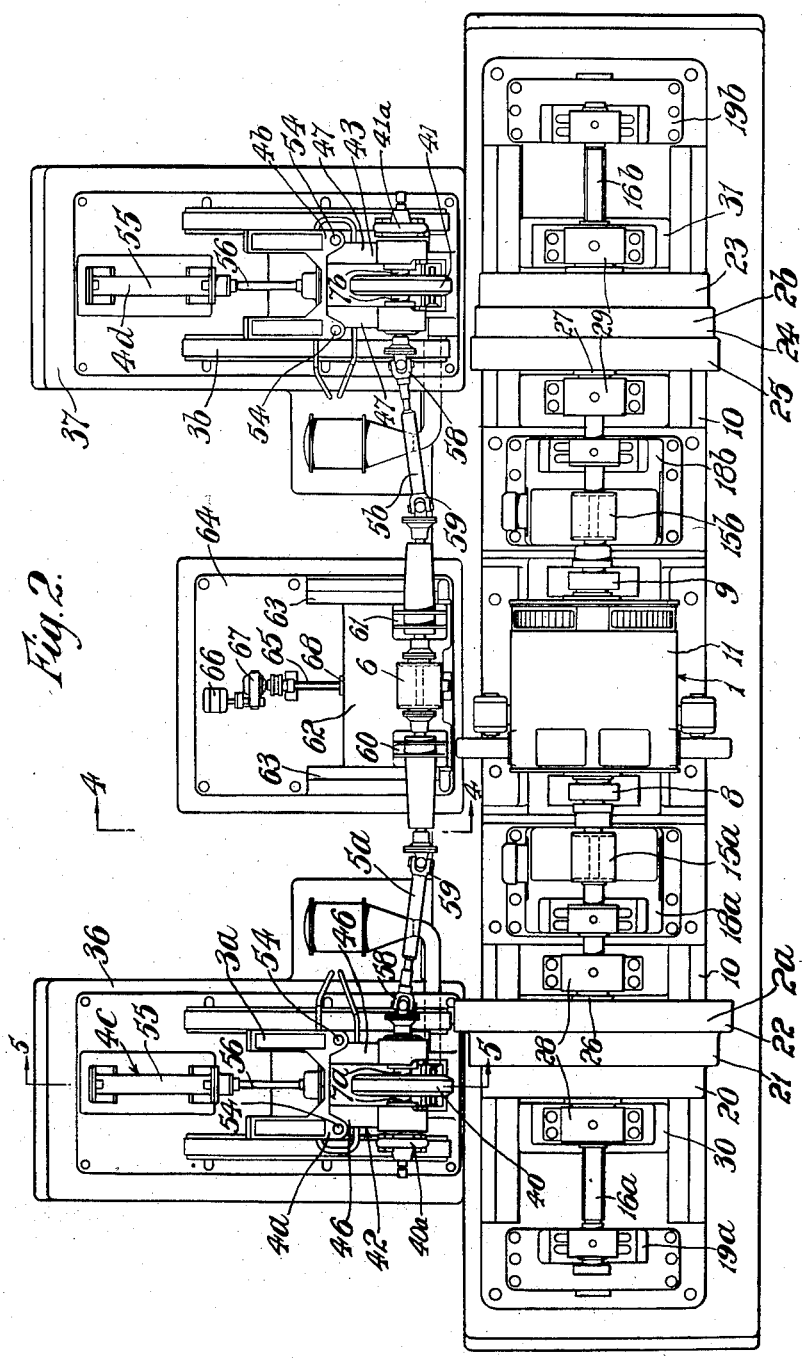
Figure 2 is a plan view of the apparatus shown in Figure 1.

A pair of tires to be tested are each mounted on a wheel. The bolts securing each of the pairs of half couplings 44 mounted on the two-part spindles 7a and 7b are removed as are the arm securing bolts 69. The left-hand arm of arms 46 and the right-hand arm of arms 47 are pivoted outwardly and the wheels located between the half-couplings 44, the arms swung back into the position shown in the drawings and the half-coupling bolts and the securing bolts replaced. The drums are then traversed by means of motors 32 and 33 and lead-screws 34 and 35 into a position such that the tires will be located adjacent to different diameter portions of the drums. For the purpose of the description it will be assumed that the left-hand tire (see Figure 2) will be located adjacent to a smaller diameter portion (20) of its associated drum than will the tire on the right-hand side of the machine (portion 23).

The hydraulic piston and cylinder assemblies 4c and 4d are then actuated to move the carriages 4a and 4b towards the drums 2a and 2b and to cause the tires carried thereby to be subjected to a radial load applied to each tire. The load on each tire is measured by means of the load capsule 57 associated with the piston rod 56 applying a load to that tire or by the summation of the loads on the two capsules 51 associated one with each of the two bearings 48 carrying the spindle 7a or 7b which supports the tire under consideration.

The motor 1 is then started and the drums 2a and 2b are driven thereby, the peripheral speed of the drum 2a being higher than that of the drum 2b. Since, however, the tires are directly interconnected through their wheels, the half-couplings 44, the spindles 7a and 7b, the telescopic shafts 5a and 5b and their associated universal joints 58 and 59, and the torquemeter 6, they are constrained to rotate at the same peripheral speed. Slip must therefore take place between the tires and the drum surfaces (portions 20 and 23), and the conditions of tire load can be adjusted so that the slip between each tire and its associated drum has either the same percentage value in each case or else the loads may be adjusted so that the slip is shared between the tires according to a predetermined proportion.

In view of the fact that the portion 20 of the left-hand drum surface is of greater diameter than the portion 23 of the right-hand drum, when steady conditions are achieved, the tire associated with the left-hand drum will be travelling at a lower peripheral speed than that of the portion 20 and the slip thus caused will simulate the conditions set up during braking of a rubber-tired vehicle. This will be referred to hereinafter as negative slip. By comparison the tire associated with the portion 23 of the right-hand drum surface will be travelling at a higher peripheral speed than that of the portion 23 of the right-hand drum surface and the slip thus caused will simulate driving, as opposed to braking conditions. This will be referred to hereinafter as positive slip.

It will be understood that the amount of positive or negative slip of a tire, under given conditions of friction, load, etc., is a measure of the driving or braking torque imposed on the tire and thus of the torque being transmitted. Since, therefore, the machine reproduces conditions of slippage of a tire under load, it provides a convenient method of measuring in a laboratory the power loss or rolling resistance of a tire under conditions of torque transmission.

Varying amounts of slip, and therefore conditions of power transmission may be obtained on each drum by suitably arranging the diameters of the stepped portions of each drum, for example, by means of the following arrangement:

DRUM A

|  | Outer step | Middle step | Inner step |
| --- | --- | --- | --- |
| Percentage difference in diameter compared with reference diameter | 10 | 0 | +12 |

DRUM B

|  | Outer step | Middle step | Inner step |
| --- | --- | --- | --- |
| Percentage difference in diameter compared with reference diameter | 0 | −4 | −8 | the following percentage slip can be obtained on each drum:

0, 1, 2, 3, 4, 5, 6, 8, 10

When utilising the apparatus described, in order to measure the power loss of the tires, the total in the two tires may be calculated either from the load capsule 14 associated with the electric motor frame or from the difference between the readings of the torquemeters 15a and 15b associated with the shafts 16a and 16b.

The power loss of an individual tire may be calculated from the difference between the reading of the torquemeter 15a or 15b adjacent to the drum upon which the tire is being tested and the reading of the torquemeter 6 associated with the spindles 7a and 7b, the speeds of rotation of the tire and associated drum being known and measured by means of, e. g., a portable tachometer.

The torque being simultaneously transmitted by the tires, i. e. the driving or braking torque thereof, is measured by the spindle torquemeter.

The loads on the two hydraulic load-measuring capsules 52 associated one with each of the two bearings 48 carrying the spindle 7a or 7b provide a measure, for the tire under consideration, of the drag or driving force on that tire, which in conjunction with the rolling radius of that tire, is a measure of the torque applied to that tire.

After the measurements have been taken and the test complete, the apparatus may be brought to rest either by regenerative braking of the driving motor or mechanically, by operation of brakes associated with the drums.

An alternative embodiment of the invention is like the above-described embodiment in all details except that the bedplates 36 and 37 are slidable laterally to allow the tires to be brought into contact with the appropriate steps of the drums, the drums themselves being non-slidably attached to the shafts 16a and 16b.

By means of apparatus according to the invention only the power loss of the tires (or tire) under test, together with such other comparatively small losses due to windage of drums (or drum) and bearing losses, are supplied by the motor. The torque developed on the tires (or tire) by slippage on a drum being transmitted back to the drum. In the case of a machine for testing a single tire the torque is returned to the drum through the gear box or the like and, in case of a machine for simultaneously testing a pair of tires, the torque is returned to the system from one tire to the other and back through one drum to the other through the motor shaft.

When the apparatus is utilised for measuring the power loss of belts, rope drives or the like, the belt, rope or the like is supported on a pair of pulleys and the belt, rope or the like applied to the drum in the manner described above for tires.

Although the invention has been described in connection with the measurement of the power loss of a pneumatic tire and the torque transmitted by it, it will be understood that it may be used on all devices to which it is applicable and that the word "tire" is not one of limitation.

Having now described our invention—what we claim is:

1. A method of measuring the power loss of a tire and for producing and measuring the torque simultaneously transmitted thereby comprising loading a tire into contact with the outer peripheral surface of a drum, driving the tire and the drum by means of a common motor and at different peripheral speeds whereby slip takes place therebetween, measuring the torque supplied by the motor in order to ascertain the tire power loss, measuring the speed of rotation of the tire and measuring the torque transmitted from the tire back to the motor in order to ascertain the torque transmitted thereby.

2. A method of measuring the power loss of at least one tire and for producing and measuring the torque simultaneously transmitted thereby comprising loading a pair of directly coupled tires, each into contact with the outer peripheral surface of a drum, one being provided for each tire and one tire contacting a peripheral surface of one drum of greater diameter than the diameter of the peripheral surface of the drum contacted by the other tire, driving the drums by means of a common motor, measuring the torque transmitted between the tires, measuring the driving torque supplied by the motor, measuring the speed of rotation of the tire, and measuring the torque transmitted between the motor and one of the drums.

3. Apparatus for measuring the power loss of a tire and for producing and measuring the torque simultaneously transmitted thereby comprising a drum, a motor directly coupled thereto, a supporting member for supporting a tire in driving contact with an outer peripheral surface of the drum, means associated with the supporting member for applying a load to the tire, means for transmitting torque from the tire back to the motor, means for measuring the torque supplied by the motor and means for measuring the torque transmitted from the tire back to the motor.

4. Apparatus according to claim 3 wherein the means for applying load to the tire comprises a hydraulic piston and cylinder assembly connected to a stationary part of the apparatus and to the supporting member whereby actuation of the piston and cylinder assembly is adapted to move the supporting member towards the drum and to apply load to the tire.

5. Apparatus according to claim 4 wherein the supporting member comprises a carriage having freely rotatable rollers attached thereto, a pair of spaced-apart parallel channel-shaped guides being provided within which the rollers are adapted to run during movement of the carriage towards and away from the drum.

6. Apparatus according to claim 4 wherein a hydraulic load-measuring capsule is located between the piston and cylinder assembly and the part of the apparatus to which it is connected for the measurement of the load applied to the tire.

7. Apparatus according to claim 3 wherein the supporting member comprises a forked bearing-carrying member, a spindle for rotatably supporting a wheel and tire assembly, said spindle being mounted on a pair of axially spaced-apart bearings, one located in each arm of the forked member, the axis of rotation of the said spindle and the axis of rotation of the drum lying in a common horizontal plane and the spindle being drivably connected by means of a universal joint to the means for transmitting torque from the tire back to the motor.

8. Apparatus according to claim 7 wherein each of the bearings is located in an arm of the forked member at spaced-apart intervals of 90° by means of load capsules, a pair of said capsules lying in a substantially vertican plane and the other pair lying in a substantially horizontal plane and each pair of capsules comprising a hydraulic load-measuring capsule and a pneumatic load capsule, means being provided for pneumatically loading the pneumatic load capsule in order to pre-load the hydraulic capsules.

9. Apparatus according to claim 7 wherein one of the arms of the forked bearing member is hinged so as to swing on a vertically mounted hinge pin, a two-part spindle being provided, one part being rotatably supported by one of the bearings carried by the arms and the other part being rotatably supported by the bearing carried by the other arm, each part of the two-part spindle being provided with a half-coupling member located between the said arms one half coupling being detachably attached to the other and the half-couplings being drivably attachable to a wheel and tire assembly, the arrangement being such that a part-spindle and half coupling is movable by means of the hinged arm towards and away from the other part-spindle and half coupling.

10. Apparatus according to claim 3 wherein the motor frame is capable of limited rotational movement and the means for measuring the torque supplied by the motor comprises a substantially radially projecting trunnion attached to the motor frame and located with a hydraulic load-measuring capsule carried by a rigid and stationary part of the apparatus, the arrangement being such that the torque supplied by the motor causes limited rotational movement of the frame so as to transmit a proportional load through the trunnion to the said capsule.

11. Apparatus according to claim 3 wherein braking means associated with the drum and motor are provided.

12. Apparatus according to claim 3 comprising a second drum directly coupled to the motor at its end remote from that coupled to the first drum, one drum having a peripheral surface of greater diameter than a peripheral surface of the other drum, a second supporting member for supporting a second tire in driving contact with an outer peripheral surface of the second drum, a second means associated with the supporting member for applying a load to a second tire, an intermediate shaft and a universal joint attached thereto for directly coupling a tire carried by the second supporting member with a tire carried by the first supporting member and means attached to the said shaft for measuring the torque transmitted between the tires.

13. Apparatus according to claim 12 wherein the drums are of stepped diameter, means being provided for relatively adjusting the position of each drum and its associated supporting member in order to bring a tire carried by a supporting member into contact with any one of the stepped diameter portions of the associated drums.

14. Apparatus according to claim 13 wherein each of the drums is rigidly mounted on a sleeve, said sleeve being slidable axially on the motor shaft yet being drivably keyed thereto, each sleeve, being supported at each end by means of a bearing supporting member, carried on a base, means being provided for traversing each base so that the drums are independently movable axially of the motor shaft.

15. Apparatus according to claim 12 wherein the intermediate shaft comprises two telescopic half shafts, each half shaft being attached by means of a universal joint to one of said spindles and the half-shafts being interconnected through universal joints and a torque meter, said torque meter being mounted at each end in bearings carried by a platform means being provided for traversing the platform towards and away from the axis of rotation of the drums.

16. Apparatus according to claim 12 wherein means for measuring the motor shaft torque are provided between the motor and the drum at each end of the motor.

17. Apparatus according to claim 12 wherein braking means are provided for the motor and drums and for each of the spindles.

18. Apparatus according to claim 3 wherein the means for transmitting torque from a tire carried by the supporting member back to the motor comprises a gear box drivably connected at one end to the motor and at the other end to the tire, the gear box being capable of driving the tire at a different peripheral speed to that of the drum.

References Cited in the file of this patent

UNITED STATES PATENTS

| | | |
|---|---|---|
| 1,479,338 | Thomas | Jan. 1, 1924 |
| 1,482,706 | Short | Feb. 5, 1924 |
| 1,490,899 | Scott | Apr. 15, 1924 |
| 2,157,903 | Lapsley | May 9, 1939 |
| 2,371,607 | Collins | Mar. 20, 1945 |